Figure 1:
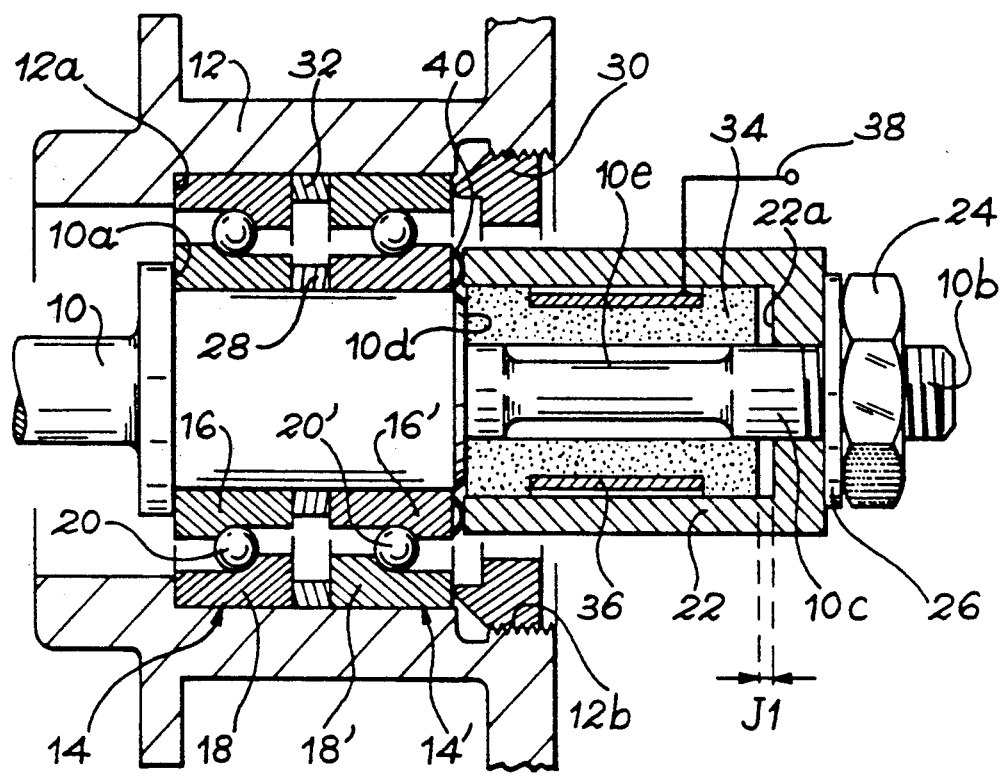

United States Patent [19]

Schoeffter

[11] Patent Number: 5,030,016
[45] Date of Patent: Jul. 9, 1991

[54] PROCESS AND APPARATUS FOR THE RELEASE OF A PRESTRESS INITIALLY APPLIED TO A MECHANISM SUCH AS A BEARING ON BOARD A SPACE VEHICLE

[75] Inventor: Jean-Pierre Schoeffter, Mouans Sartoux, France

[73] Assignee: Aerspatiale Scoiete Nationale Industrielle, Paris, France

[21] Appl. No.: 551,567

[22] Filed: Jul. 11, 1990

[51] Int. Cl.⁵ .................... F16C 41/04; F16C 19/50; B21D 53/10
[52] U.S. Cl. .................. 384/448; 29/898.09; 384/476; 384/517
[58] Field of Search ............... 384/448, 476, 490, 493, 384/504, 517, 537, 540, 542, 556, 563, 627, 903; 29/898.09

[56] References Cited

U.S. PATENT DOCUMENTS

| | | | |
|---|---|---|---|
| 3,985,209 | 10/1976 | Glassow | 384/448 |
| 4,324,441 | 4/1982 | Rouverol et al. | 384/903 X |
| 4,657,412 | 4/1987 | McLarty et al. | 384/517 X |
| 4,850,719 | 7/1989 | Moseley et al. | 384/517 X |
| 4,961,654 | 10/1990 | Pangburn et al. | 384/542 X |

FOREIGN PATENT DOCUMENTS 0303169 2/1989 European Pat. Off. .
2192643 2/1974 France .

*Primary Examiner*—Thomas R. Hannon
*Attorney, Agent, or Firm*—Pearne, Gordon, McCoy & Granger

[57] ABSTRACT

In space vehicles, mechanisms such as ball bearings (14, 14') are subject to an initial preload or prestress enabling them to withstand the vibrations caused by the launch and without leading to any clearance or play. A member (34) made from a shape memory material e.g. makes it possible under the effect of its elongation, to release said preload when the vehicle is in the operational mode. The control of the release can take place by means of a heating resistor (36), whose energization leads to the member (34) clearing its shape change temperature.

10 Claims, 1 Drawing Sheet

PROCESS AND APPARATUS FOR THE RELEASE OF A PRESTRESS INITIALLY APPLIED TO A MECHANISM SUCH AS A BEARING ON BOARD A SPACE VEHICLE

DESCRIPTION

The invention relates to a process and an apparatus for releasing a prestress or preload initially applied between the moving parts of a mechanism such as a bearing on board a space vehicle, when the latter is in the operational mode.

Space vehicles such are artificial satellites and orbiting stations have equipment such as solar panels, antennas, etc., which incorporate mechanisms permitting relative movements between the parts forming them when the vehicle is in orbit. These mechanisms are usually ball bearings, but can also comprise screw-nut systems and bearings of various types.

During the launch of space vehicles, said mechanisms are subject to high mechanical stresses. In the case of ball bearings, the stresses are transmitted from one ring to the other whilst passing through the balls. The presence or creation of clearances during said phase would therefore lead to shocks between the balls and the rings, leading to surface deterioration and in the long term to an unsatisfactory operation and then a deterioration of the bearing. Thus, it is conventional practice to apply a preload or prestress to said mechanism to avoid any clearance or play occurring therein at the time of launch.

However, said preload or prestress is limited to a minimum value so as not to have an excessively disadvantageous effect on the mechanism under operational conditions. Thus, under these conditions, only a prestress approximately ten times lower than that to be applied during the launch is really necessary. Thus, when the vehicle is in the operational mode, any increase in the prestress normally leads to an increase in the resistant torque of the mechanism, operational irregularities linked with the fluctuation of said torque and a limitation to the service life.

Therefore, in practice, the prestress or preload applied to the mechanisms is the result of a compromise between contradictory requirements at the time of launch and during the flight of the space vehicle. Thus, in the particular case of a ball bearing, the latter is dimensioned by determining the static forces representing the vibrational loads which it undergoes during launch and then to said bearing is applied a minimum prestress, which is approximately equal to one third of these static forces. This prestress must be accurately applied (approximately 20%), which makes it necessary to use sensitive strain gauges and leads to a difficult, long and expensive procedure. This method also requires interfaces, which are not always compatible.

In view of the fact that to these mechanisms is applied a limited prestress, the risks of creating clearances during launch are not completely eliminated in the presence of high forces.

Consequently, it is also standard practice to place between the moving parts of the mechanisms or between the components connected thereto, a rigid member by which part of the loads produced during launch are transmitted. When the space vehicle is under operational conditions, said rigid member must be broken by means of a pyrotechnic control.

The present invention consequently relates to a process and an apparatus making it possible in a particularly simple and non-constraining manner, to release the prestress applied during lauch to the mechanisms, such as ball bearings on board space vehicles, when said vehicles arrive in the operation mode, which makes it possible on the one hand to make said prestress limit-free and consequently avoid any risk of deterioration to the mechanisms during the launch phase and on the other hand limit the prestress in the operational mode without it being necessary to use a rigid member linked with a pyrotechnic control.

According to the invention this problem is solved by means of an apparatus for the release of a prestress or preload initially applied by prestressing or preloading means between the moving parts of a mechanism on board a space vehicle, when the latter is in the operational mode, characterized in that it comprises a member made from a shape memory material associated with the prestress or preload means, so as to control a release of the prestress or preload applied between said parts under the effect of a change to its shape, when clearing a phase change temperature of the shape memory material.

It is pointed out that a shape memory material is a material having two stable crystalline phases, respectively an austenitic and a martensitic phase, as a function of whether its temperature is above or below the structural transformation temperature characteristic of said material. When the material is in the martensitic phase and is exposed to a mechanical stress, it is plastically deformed and retains said deformation for as long as the temperature remains below its structural transformation temperature. As soon as the temperature exceeds this threshold, the structure becomes austenitic again and the material reassumes its initial shape.

The shape change of the material produced by the clearing of the phase change temperature may in particular consist of an elongation. The member made from the shape memory material then acts as a jack, which is adjusted prior to launch to a size such that a high prestress is applied to the mechanism by the prestressing means. The heating of the material, which can be ensured either by a heating means such as an electrical resistor positioned in the vicinity of the shape memory material member, or by means of solar energy, elongates the said member, which has the effect of releasing the prestress applied to the mechanism.

The invention also relates to a process for the release of a prestress or preload initially applied between moving parts of a mechanism carried on board a space vehicle when the latter is in the operational mode, characterized in that it consists of controlling a shape change of a member made from a shape memory material associated with said mechanism, so as to bring about a release of the prestress applied between the parts by making said member clear a phase change temperature of the shape memory material.

The invention is described in greater detail hereinafter relative to non-limitative embodiments and the attached drawings, wherein show:

FIG. 1 A longitudinal sectional view of a hinge or joint on board a space vehicle having two ball bearings to which is applied an axial prestress or preload, said arrangement being provided with an apparatus according to the invention for releasing said prestress or preload and which is shown in its initial inactive state.

Figure 2:
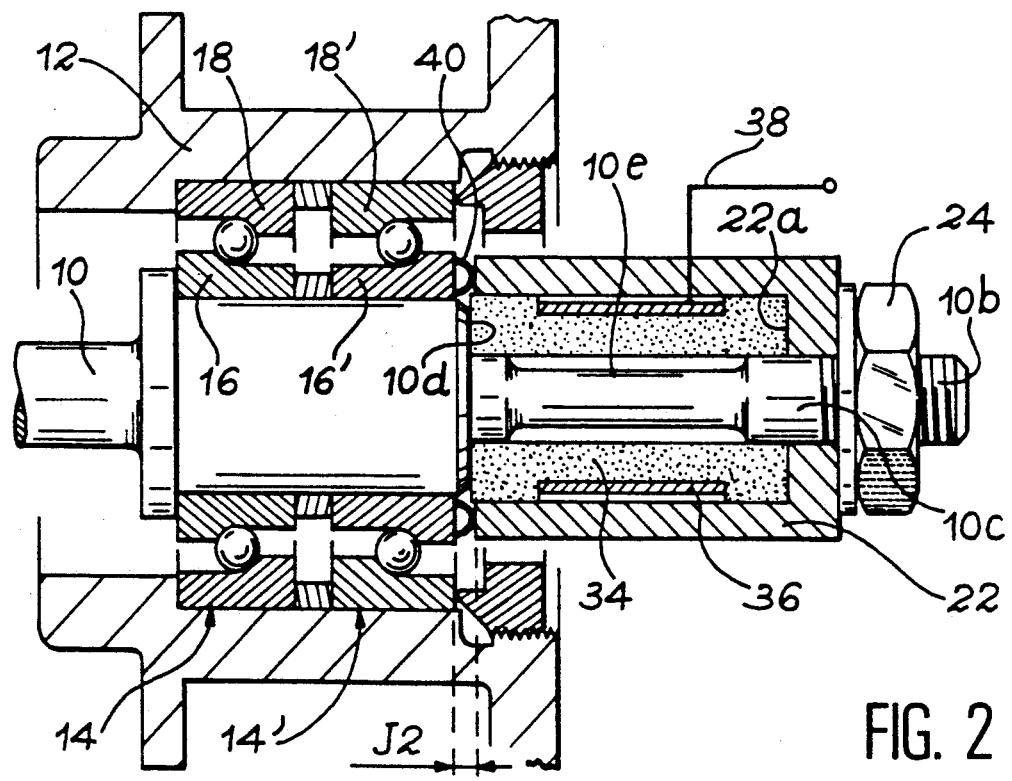

FIG. 2 A view comparable to FIG. 1, in which the prestress release apparatus is shown in its actuated state.

The joint shown in FIG. 1 is e.g. the joint of a solar panel of a satellite or orbiting station. This joint comprises a spindle 10, which is assumed to be fixed in the represented embodiment, as well as an outer sleeve 12 mounted so as to rotate on the spindle 10 via two ball bearings, 14, 14'. Each of the bearings 14, 14' respectively comprises an inner ring 16, 16', an outer ring 18, 18' and balls 20, 20' rolling between the rings.

The inner rings 16, 16' are mounted on the spindle 10 between a shoulder 10a shaped onto the latter and a tubular spacer 22 arranged coaxially around the spindle 10. The opposite end of said spacer 20 is positioned facing a nut 24 screwed onto a threaded end 10b of the spindle 10, a thrust washer 26 being interposed between the nut 24 and the spacer 22.

The nut 24 and the threaded end 10b of the spindle 10 consequently constitute the precharging or prestressing means by means of which an axial precharge or prestress can be applied to the fixed inner rings 16, 16' of the bearings 14, 14'. A tubular spacer 28 placed between the rings 16, 16' ensures the transfer of said prestress from one ring to the other.

The outer rotary rings 18, 18' are mounted in the outer sleeve 12 between a shoulder 12a and a nut 30 screwed into a reamed end 12b of the sleeve. A tubular spacer 32 is also placed between the outer rings 18, 18'.

The structure described hereinbefore is of a conventional nature, with the exception of the tubular spacer 22, the thrust washer 26 being normally in direct contact with the inner ring 16' of the bearing 14'.

According to the invention, to said structure is added a supplementary part constituted by a second tubular spacer 34, which is made from a shape memory material and which is positioned coaxially within the spacer 22 around a reduced diameter portion 10c of the spindle 10 on which is formed the threaded end 10b. More specifically, the tubular spacer 34 is placed between a shoulder 10d of the spindle 10 located in a plane adjacent to the end face of the inner ring 16' on which bears the spacer 22 and a shoulder 22a formed in said spacer in the vicinity of the washer 26.

In the position illustrated in FIG. 1 and which corresponds to the ground fitting position of the joint and which remains unchanged throughout the launch of the space vehicle on which said joint is carried, an axial clearance J1 exists between the spacer 34 and the shoulders 10d and 22a. Consequently, the prestress obtained by tightening the nut 24, which is transmitted by the spacer 22 to the inner rings 16' and 16 of the bearings 14' and 14 is not supported by the shape memory material spacer 34.

The shape memory material for producing the tubular spacer 34 is chosen as a function of the conditions of use, taking account more particularly of the phase change temperature of the alloy. In a non-limitative manner, it is possible to use for the purposes of the invention shape memory materials in the form of iron-based alloys (Fe-C, Fe-Cr, Fe-Ni . . .), cuprous alloys or noble metals (Cu-Zn, Cu-Sn, Cu-Al, Cu-Zn-Al, Cu-Zn-Al-Ni, Cu-Al-Ni, Ag-Cd, Au-Cd, . . .), alloys based on titanium and/or nickel (Ni-Ti, Ni-Ti-Fe, Ni-Al, . . .) and certain pure metals (CO, Ti, Na).

In the embodiment illustrated in the drawings, the heating of the shape memory material tubular spacer 34 up to its transformation temperature is obtained by means of a heating device e.g. constituted by an electrical resistor 36 directly wound around the spacer 34. Electrical conductors 38 make is possible to connect said resistor 36 to a not shown power supply carried on the space vehicle, via a not shown switch, which is open at the time of launch.

When said switch receives a closing instruction, the spacer 34 made from the shape memory material is heated to a temperature above its structural transformation temperature. Therefore the structure of said material again becomes austenitic, which has the effect of making it reassume its initial shape which, in this case, corresponds to a greater length of the spacer 34.

As illustrated in FIG. 2, an adequate dimensioning of the components of the assembly has the effect, during the elongation of the spacer 34, of bringing about a permanent elongation of the reduced diameter portion 10c of the spindle 10, as a result of the spacer 34 bearing against the shoulders 10d and 22a. Under these conditions, the prestress initially applied to the inner rings of the bearings via the spacer 22 is released and a clearance J2 appears between the spacer 22 and the inner rings 16, 16' of the bearings.

In the embodiment illustrated in FIGS. 1 and 2, said clearance J2 is eliminated by positioning, during installation, at least one elastic washer 40 or any technically equivalent means, between the inner ring 16' and the spacer 22. Under the operational conditions, said elastic washer 40 maintains a slight axial prestress or preload, which has the effect of eliminating the clearance J2.

In order to facilitate the elongation of the reduced diameter portion 10c of the spindle 10, said portion 10c is advantageously machined at 10e over part of its length, in order to further reduce its cross-section and as illustrated in the drawings.

In a not shown variant, the heating of the shape memory material is obtained without using the electric power of the satellite, by orienting the latter following its placing in orbit, in such a way that the material is heated by solar power.

In an arrangement which is the reverse of that described hereinbefore, i.e. in which the rotary spindle is mounted in a fixed sleeve via one or more bearings, an identical structure is used in order to initially apply an axial prestress or preload to the outer ring of the bearings.

If in future a shape memory materials becomes available, which has mechanical characteristics enabling it to support the prestress applied, e.g. by means of the nut 24, it could be directly used for producing the spacer 22. The clearing of the phase change temperature of this material would then directly eliminate the prestress by a length reduction of said spacer.

As a result of the apparatus according to the invention, simple and small means are used for bringing about a release of the prestress initially applied to mechanisms such as bearings or nut-screw systems on board space vehicles, as soon as the latter are in the operational mode. The risks of creating clearances in these mechanisms during launch are consequently eliminated, because a significantly higher prestress than previously can then be applied. Moreover, the elimination of the limitation to said prestress makes it possible to significantly simplify the prestress application procedure, which now only requires an accuracy of ±100%. It is also possible to avoid the need for interposing a rigid member during launch and of breaking said member following launch by means of a pyrotechnic control, which obviates all the disadvantages inherent in such a system. Finally, the elimination of the prestress in the operational mode, or the application of a very low prestress significantly increases the reliability of the mechanisms.

Moreover, the advantages inherent in shape memory materials are added thereto. Thus, the reliability of a mechanism controlled in this way is total, its operation producing neither shocks, nor pollution and its overall dimensions are very small.

Obviously the invention is not limited to the embodiment described in exemplified manner hereinbefore and instead covers all variants thereof. As has already been observed, its application is not limited to ball bearings. In addition, the structure of the prestressing means can also differ from that described, as can the shape of the shape memory material part. Finally, the relative rotation between the two parts of the mechanism can be unlimited or, on the contrary, can be limited to angles below 360°.

I claim:

1. Apparatus for the release of a prestress or preload initially applied by prestressing or preloading means between the moving parts of a mechanism on board a space vehicle, when the latter is in the operational mode, said apparatus comprising a member made from a shape memory material associated with the prestress or preload means, so as to control a release of the prestress or preload applied between said parts under the effect of a change to its shape, when clearing a phase change temperature of the shape memory material.

2. Apparatus according to claim 1, wherein the mechanism comprises at least one bearing having a fixed ring and a rotary ring between which are placed the rolling members, the prestressing means acting on the fixed ring via a first tubular spacer, so as to initially apply an axial prestress to said fixed ring.

3. Apparatus according to claim 2, wherein the shape memory material member is a second tubular spacer arranged coaxially to the first spacer, the clearing of the phase change temperature having the effect of elongating the second spacer and of transferring the prestress from the fixed ring to the second tubular spacer.

4. Apparatus according to claim 2, wherein the prestressing means act on said parts via elastic means.

5. Apparatus according to claim 4, wherein the elastic means are interposed between the first tubular spacer and the fixed ring of the bearing.

6. Apparatus according to claim 2, wherein the fixed ring is an inner ring of the bearing mounted on a fixed spindle, the prestressing means incorporating a nut screwed onto a threaded end of said spindle traversing the first tubular spacer.

7. Apparatus according to claim 2 also comprising heating means located in the vicinity of said shape memory material member.

8. Process for the release of a prestress initially applied between the moving parts of a mechanism carried on a space vehicle, when the latter is in the operational mode, comprising controlling a shape change of a shape memory material member associated with said mechanism, so as to obtain a release of the prestress applied between the parts by making said member clear a phase change temperature of the shape memory material.

9. Process according to claim 8, wherein said member is made to clear the phase change temperature of the shape memory material by heating said member with the aid of heating means located in the vicinity thereof.

10. Process according to claim 8, wherein said member is made to clear the phase change temperature of the shape memory material by heating the member by solar power.

* * * * *